United States Patent
De Guglielmo et al.

(10) Patent No.: US 6,520,316 B2
(45) Date of Patent: Feb. 18, 2003

(54) DEVICE FOR FORMING SUCCESSIVE BATCHES OF ARTICLES COMPRISING MEANS OF TRANSFERRING THE ARTICLES

(75) Inventors: Pascal De Guglielmo, Montgueux; Alain Cartier, Fontvannes, both of (FR)

(73) Assignee: Aries Packaging, Rosieres Pres Troyes (FR)

(*) Notice: Subject to any disclaimer, the term of this patent is extended or adjusted under 35 U.S.C. 154(b) by 0 days.

(21) Appl. No.: 09/750,649

(22) Filed: May 11, 2001

(65) Prior Publication Data

US 2002/0008002 A1 Jan. 24, 2002

(30) Foreign Application Priority Data

Jun. 21, 2000 (FR) ............................................. 00 07945

(51) Int. Cl.⁷ ............................................. B65G 47/26
(52) U.S. Cl. ................. 198/419.3; 198/419.2; 53/448
(58) Field of Search .................. 198/419.3, 419.2, 198/418.7, 432, 433, 459.1; 53/448, 443

(56) References Cited

U.S. PATENT DOCUMENTS

| | | | | |
|---|---|---|---|---|
| 2,744,608 A | * | 5/1956 | Ardell et al. ................ | 198/22 |
| 2,827,998 A | * | 3/1958 | Breeback .................... | 198/31 |
| 3,717,236 A | * | 2/1973 | New .......................... | 198/25 |
| 4,274,533 A | | 6/1981 | Abe ........................... | 198/450 |
| 4,612,753 A | * | 9/1986 | Taylor et al. ................ | 53/398 |
| 5,070,995 A | | 12/1991 | Schaffer et al. ............. | 198/460 |
| 5,147,027 A | * | 9/1992 | Cruver ....................... | 198/419.3 |
| 5,161,664 A | * | 11/1992 | LeBras ....................... | 198/419.3 |
| 5,577,365 A | * | 11/1996 | Reuteler ..................... | 53/398 |
| 5,638,665 A | * | 6/1997 | Muller ........................ | 53/543 |
| 5,664,401 A | * | 9/1997 | Portrait et al. .............. | 53/48.6 |
| 5,699,651 A | * | 12/1997 | Miller et al. ................ | 53/448 |
| 5,784,857 A | | 7/1998 | Ford et al. .................. | 53/201 |
| 5,979,147 A | | 11/1999 | Reuteler ..................... | 53/448 |

FOREIGN PATENT DOCUMENTS

| | | | | |
|---|---|---|---|---|
| EP | 0 585 822 A1 | 3/1994 | ........... | B65G/47/84 |
| EP | 0 654 408 A1 | 5/1995 | ........... | B65B/57/14 |
| GB | 974995 | 11/1964 | | |

* cited by examiner

Primary Examiner—Christopher P. Ellis
Assistant Examiner—Rashmi Sharma
(74) Attorney, Agent, or Firm—Nawrocki, Rooney & Sivertson, P.A.

(57) ABSTRACT

A device for forming successive batches (4) of articles (2), which comprises:

Figure 1:
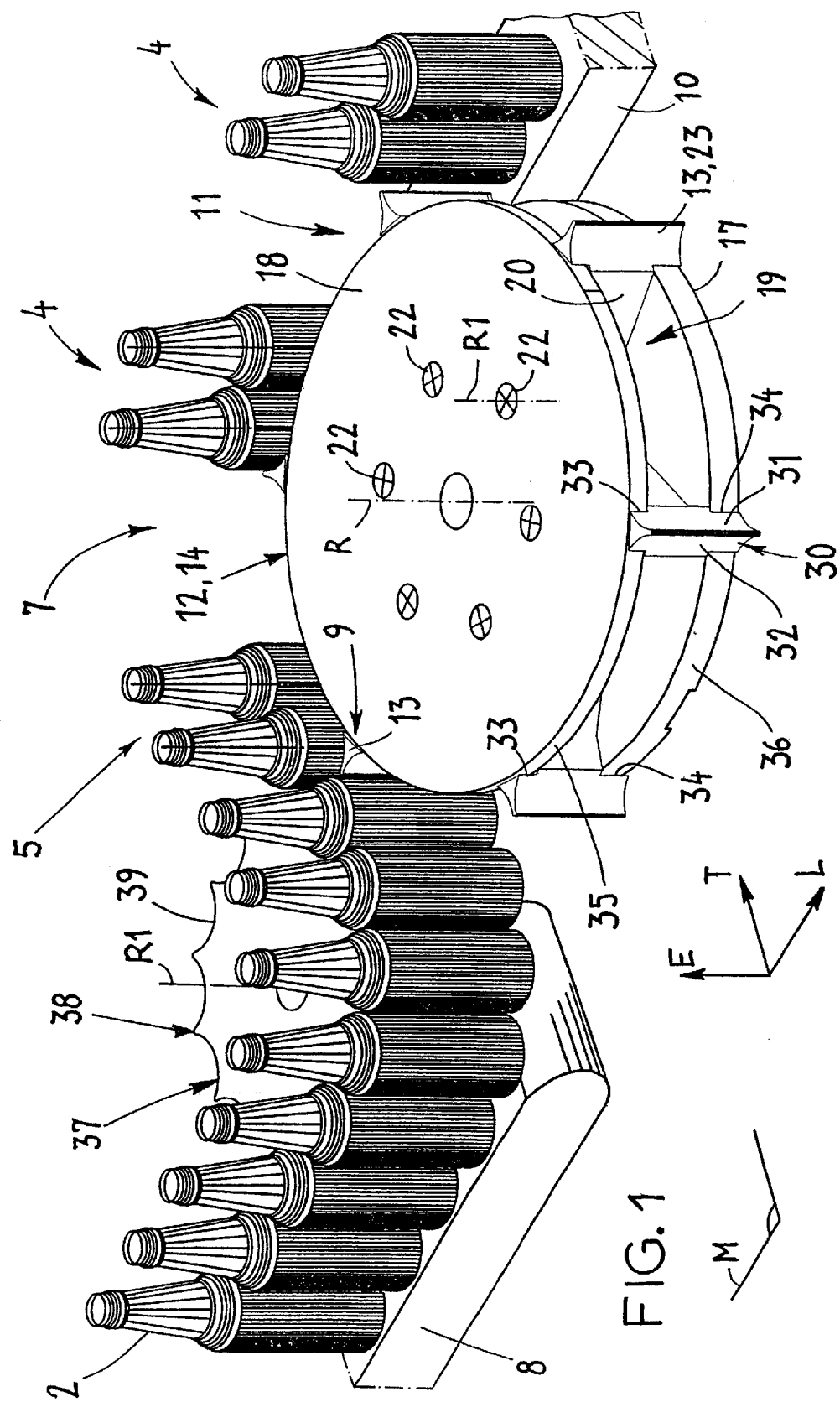

- a supply track (8) along which the articles (2) are routed up to a supply station (9), at a substantially constant input speed;
- a discharge track (10) able to receive, at a discharge station (11), the successive batches (4) of articles (2) in order to route them at an output speed greater than the input speed;
- device (12) of transferring the articles (2) from the supply station (9) to the discharge station (11), able to group the articles (2) in order to form batches (4) spaced apart, and which comprise a succession of gripping members (13) arranged so as to engage the articles (2) at the supply station (9) and to disengage them at the discharge station (11).

16 Claims, 4 Drawing Sheets

DEVICE FOR FORMING SUCCESSIVE BATCHES OF ARTICLES COMPRISING MEANS OF TRANSFERRING THE ARTICLES

The invention relates to a device for making up successive batches of articles.

The invention applies notably to the packaging of articles such as bottles, cans or pots (such as yoghurt pots), generally cylindrical in shape.

It is known that the articles are first of all routed individually on a supply track to a grouping station where the articles are formed and then spaced apart in order to be transferred to a discharge track along which they are wrapped, or packaged.

In order to form a space between two successive batches of articles, it is known that the batches can be accelerated between the supply track and the discharge track.

Distributors are at the present time seeking to reduce their stocks whilst offering ever more diversified ranges of packaged products.

As a result the throughputs of the packaging machines must be continuously reviewed upwards. Thus, in the field of the packaging of bottles or cans, at the present time throughputs of around 15,000 to 100,000 bottles per hour are being achieved.

In the known installations, the articles are grouped notably by means of grouping devices comprising gripping members driving at constant speed along a closed path.

To illustrate this type of technology, it is possible to cite notably the document GB-914 995.

These gripping members travel at a speed appreciably greater than that of the articles before they are grouped.

Because of this, the articles suffer violent impacts against the gripping members which, in the case of glass bottles, whose thickness is tending to decrease, causes a high breakage rate and limits the throughput and speed of the installation.

Devices for gripping articles are already known, which make it possible to limit the impacts, such as the one described in the document U.S. Pat. No. 5,979,147.

The device described in this document comprises a rotating disc carrying fingers coming into engagement with the articles. The articles are accelerated between the entry and exit of the device by extending the length of the fingers projecting from the disc.

This type of device does not however make it possible to appreciably reduce the impacts of the fingers against the articles. This is because, according to the number of articles per batch, the fingers will come into engagement with the articles at different points on the rotating disc so that the impact of the fingers on the articles will vary and generate a greater or lesser impact.

The invention aims to resolve notably the aforementioned drawbacks of the prior art, by proposing a device and an installation which make it possible to form batches from individual articles without causing impacts during the grouping of the articles, and which make it possible to exceed the known production rates.

To this end, a first object of the invention is a device for making up successive batches of articles, which comprises:

a supply track along which the articles are routed one by one to a supply station, at a so-called input speed which is substantially constant;

a discharge track able to receive, at a discharge station, successive batches of articles in order to route them at a so-called output speed which is greater than the input speed;

means of transferring the articles from the supply station to the discharge station, comprising a rotary member able to take and group the articles in order to form spaced-apart batches, and which comprises a succession of gripping members arranged to engage the articles at the supply station and to disengage them at the discharge station, driven continuously along a closed path, at a so-called transfer speed, greater than or equal to the input speed;

the transfer means being arranged so that the transfer speed of the gripping members is not constant, such that:

when the articles are engaged, the speed of the gripping members is substantially equal to the input speed;

when the articles are transferred, the speed of the gripping members is greater than the input speed;

when the articles are disengaged, the speed of the gripping members is substantially equal to the output speed.

The said device is characterised in that the articles are driven continuously along the said closed path on a route which follows at least a quarter of the periphery of the rotating member, so that the gripping members can come into contact with the articles and group them in successive batches, the speed of the rotating member being greater than the input speed (VE) of the articles and the rotor member making it possible to vary the number of articles per batch.

In this way, the articles are engaged gently, and then accelerated progressively, which minimises the risks of breaking and makes it possible to increase the production rates without any concerns.

Moreover, this device is quieter than the existing devices, which is due notably to the absence of impact of the gripping members against the articles.

According to one embodiment, the transfer means comprise a toothed wheel, at least part of which is mounted so as to pivot about a rotation shaft, this wheel being disposed close to the supply track and discharge track, substantially tangent to these, this wheel comprising the said gripping members.

The gripping members are for example in the form of teeth substantially regularly spaced apart, projecting radially from the toothed wheel, each tooth describing a circle passing through a first angular position in which it engages at least one article at the supply station, and a second angular position in which it disengages it at the discharge station.

The angular separation between the first and second angular positions can be between 90 and 180°, for example substantially equal to 120°.

According to one embodiment, the wheel comprises a circular fixed base and a rotating disc, both coaxial and superimposed, between which radial branches are disposed whose free ends form the said teeth.

According to a particular constructional arrangement the said branches are mounted so as to rotate on the disc by means of pivots with axes parallel to the wheel axis.

For example, each branch has a roller or a toe which cooperates with a groove provided in the base, this groove being extended in a closed loop around the axis of rotation of the wheel.

This groove is arranged so that:

when the tooth passes through the supply station, the branch which carries it pivots in the direction opposite to the rotation of the wheel so that the speed of the tooth decreases until it is substantially equal to the input speed when the articles are engaged;

between the supply station and the discharge station, the orientation of the said branch is constant with respect to the wheel, so that the speed of the tooth increases until it is substantially equal to the speed of the toothed wheel, so that the articles are grouped together in batches, accelerated and spaced apart.

According to one embodiment, the groove forms in the base a continuous cam track followed by the roller which forms the cam follower, this cam track comprising two connected portions, one of which, turned towards the supply station, has a variable curvature, and the other, turned towards the discharge station, has a substantially constant curvature, so that:

when the roller passes in the variable-curvature portion, a the branch which carries it pivots about its axis;

when the roller passes in the constant-curvature portion, the orientation of the branch is substantially constant.

The teeth comprise for example a guide surface able to cooperate with a circumference of the base.

It is also possible to provide means disposed close to the supply station, able to order and time the articles coming from the supply track, so that they have the required positioning and separation at the time they are gripped by the transfer means.

According to one embodiment, these means for ordering and timing the articles are in the form of a star wheel, mounted so as to pivot about an axis of rotation, comprising at its periphery teeth able to mesh and unmesh the articles, the teeth having housings able to receive the articles individually, the tangential speed of the said wheel being substantially equal to the input speed.

It is also possible to provide a means of driving the said star wheel and/or a means of driving the toothed wheel, connected to a control device arranged to apply to the said drive means a predetermined speed profile, chosen from amongst a preprogrammed set of speed profiles.

The or each drive means can comprise at least one motor whose rotation speed is continuously adjustable, such as an electric motor, of the brushless DC type.

Figure 2:
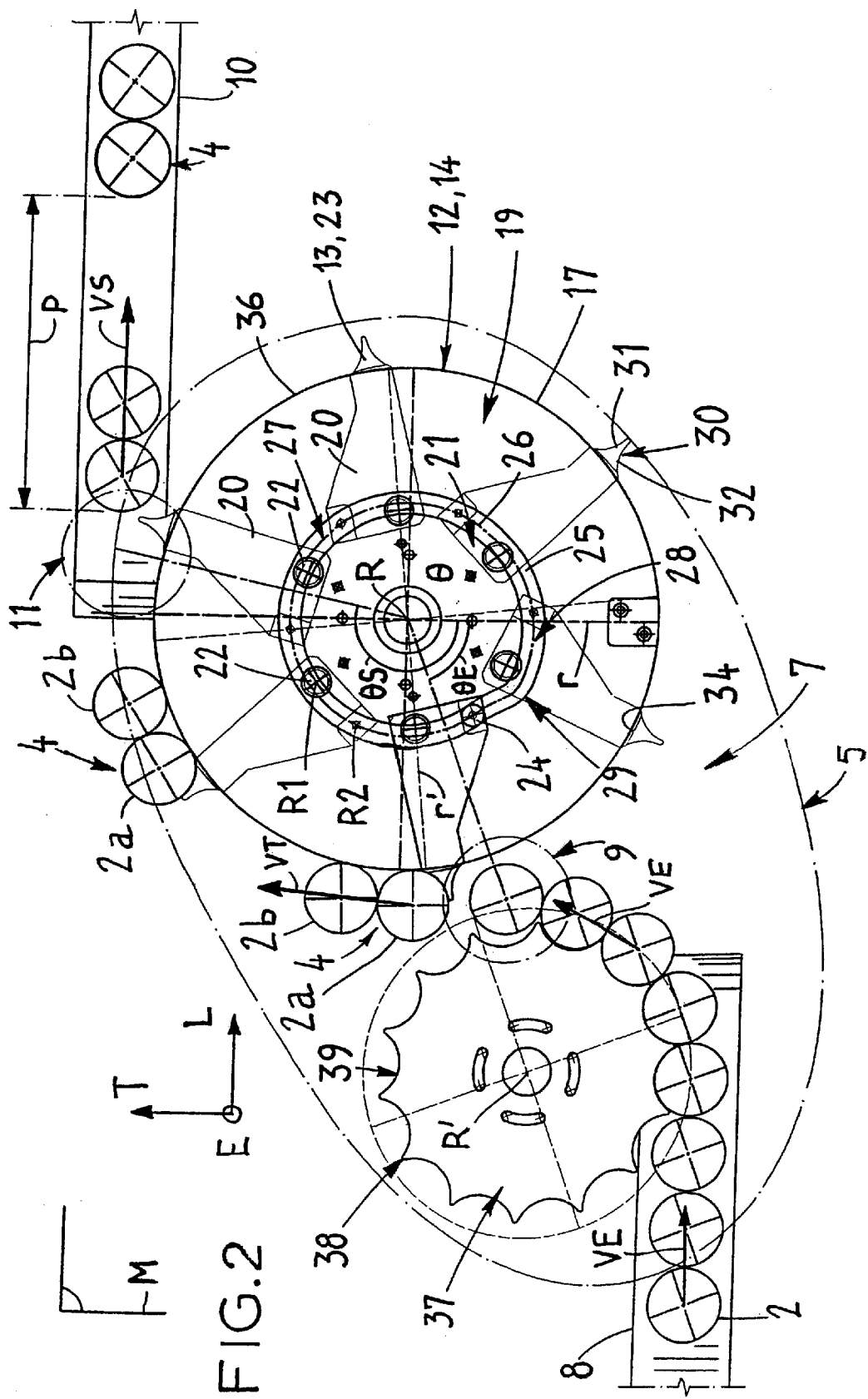
Figure 3:
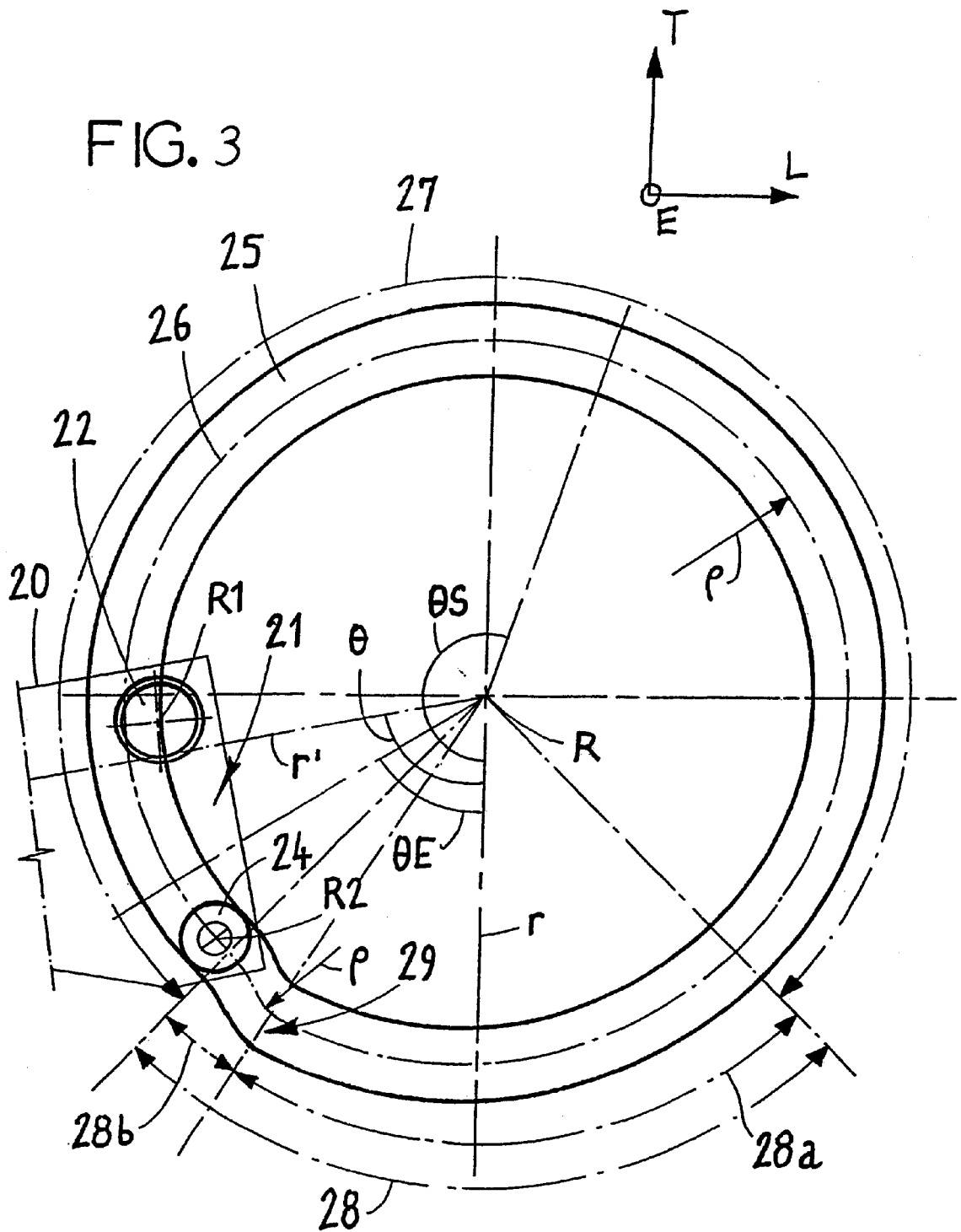
Figure 4:
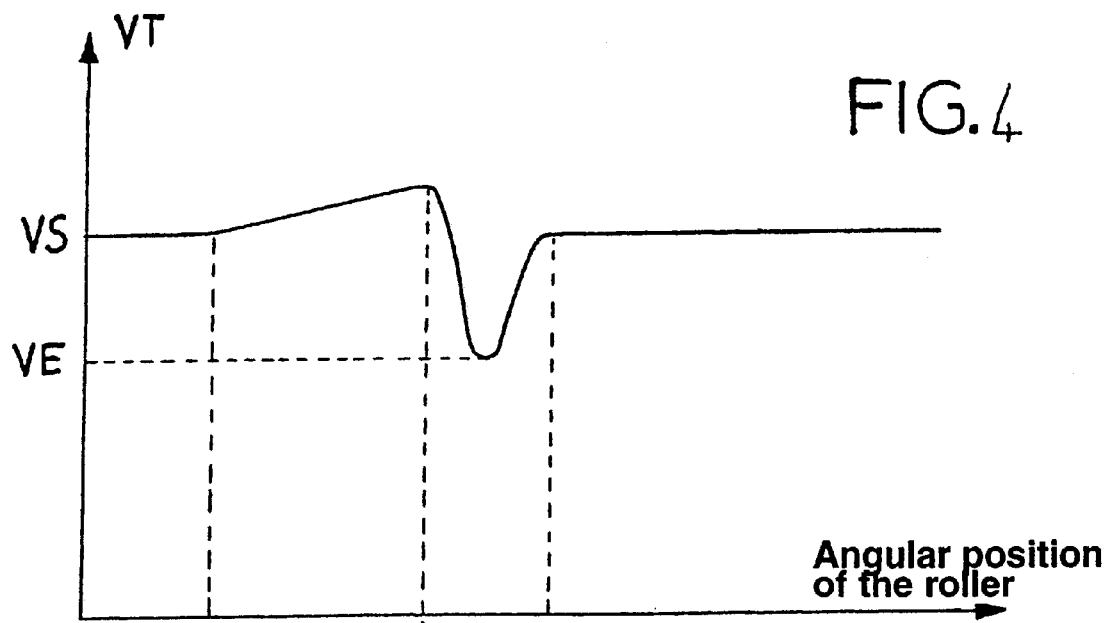
Figure 5:
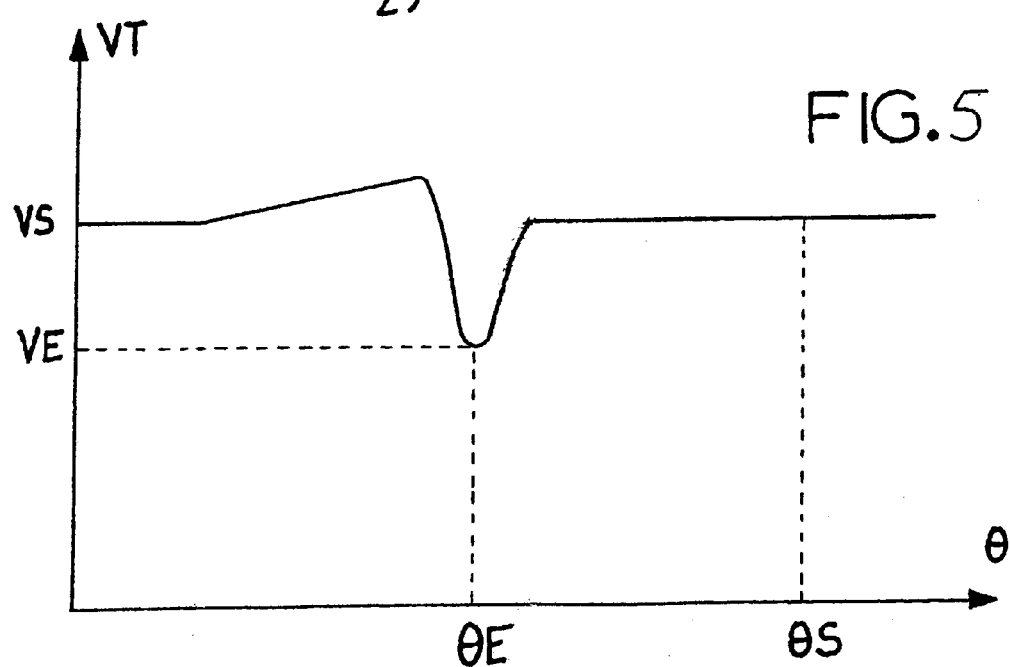

Other objects and advantages of the invention will emerge during the following description of embodiments, a description given with reference to the accompanying drawings, in which:

FIG. 1 is a perspective view of an embodiment of the device for making up successive batches of articles which comprises means of transferring articles, according to one embodiment in which they comprise a toothed wheel which has a base and a rotating disc, as well as branches mounted so as to pivot on the disc, the free ends of which form means of gripping the articles in order to ensure their transfer; a groove is formed in the base, with which rollers with which the branches are provided cooperate;

FIG. 2 is a plan view of the device of FIG. 1, in which the rotating disc is not visible in order to show the branches;

FIG. 3 is a detail view of FIG. 1, which shows the groove formed in the base of the toothed wheel; in this figure a branch is partially depicted, its inner end turned towards the shaft of the wheel, has a roller which travels in the groove; the groove comprises a constant-curvature portion and a variable-curvature portion; the branch is depicted in a position where its roller, which travels for example in a clockwise direction, has just left the variable-curvature portion and is engaged in the constant-curvature portion; and FIGS. 4 and 5 are graphs showing the speed of a gripping member carried by a branch as depicted in FIG. 2, according respectively to the angular position of the roller of the branch, and the angular position of the gripping member; FIG. 4 also shows schematically, in the form of brackets, the portion of the groove with which the roller successively cooperates when the toothed wheel rotates over one turn.

FIG. 1 depicts a device 1 for forming successive batches 4 of articles 2 such as bottles or cans, from which finished products such as packs 3 are formed.

In order to be packaged, the articles 2 undergo at least one operation of grouping by batches 4 spaced apart, an operation which, for more convenience, is assumed to take place in a substantially horizontal plane M.

This operation takes place in a grouping zone 5, to which the articles 2 are routed along a conveying path in a longitudinal direction L contained in the plane M, and illustrated in the figures.

The articles 2 start off again grouped from the grouping zone 5 whilst being routed by batches 4, for example in the longitudinal direction L.

The figures also show a transverse direction T, substantially perpendicular to the longitudinal direction L whilst being contained in the plane M, and an elevation direction E perpendicular to the other two L, T, so that the directions L, T, E form in space a direct orthogonal reference frame with respect to which the present description is given.

The terms "upstream" and "downstream" are defined with respect to the longitudinal direction L; the term "lateral" is defined with respect to the transverse direction T, the terms "above" and "below" being defined with respect to the elevation direction E.

Each batch 4 comprises a predetermined number of aligned articles 2. This number can vary between 2 and 6, or more.

Each pack 3 for its part comprises at least one batch 4 of articles 2. For the pack 3 to comprise at least two parallel batches 4 of articles 2, several convergent conveying paths can be provided (not shown), in order to form separate series of successive batches 4, which are then grouped together again.

In order to form packs 3 comprising two identical batches 4 of aligned articles 2, it is thus possible to provide, for example, two conveying paths symmetrical with respect to a longitudinal elevation plane, to form two distinct series of batches 4.

The device 1 for making up the batches 4 is disposed substantially in the grouping zone 5. It comprises a supply track 8 along which the articles 2 are routed one by up to a supply station 9, situated in the grouping zone 5, and for example merged with one end of the supply track 8.

The articles 2 are routed at a high input speed VE substantially constant along the supply track 8, whilst being juxtaposed with each other, by means of a motorised conveyer belt or any other equivalent means.

The device 1 also comprises a discharge track 10, able to receive, at a discharge station 11 situated in the grouping zone 5, the articles 2 grouped by batches 4 in order to route them from upstream to downstream at a substantially constant so-called output speed VS, greater than the input speed VE.

The device 1 also comprises means 12 of transferring the articles 2 from the supply station 9 to the discharge station 11, which take the articles 2 at the supply station 9 and group them together forming batches 4 spaced apart.

The transfer means 12 are arranged so that the number of articles 2 per batch 4 is variable without stopping the movement of the said articles.

To this end, according to one embodiment, the transfer means 12 comprise a rotating member able to take and group the articles (2) in order to form spaced-apart batches (4), the said rotating member comprising a succession of gripping members 13, which engage the articles 2 at the supply station 9 and disengage them at the discharge station 11 after they have been grouped together by batches 4 and spaced apart.

The rotating member makes it possible to vary the number of articles 2 per batch.

Between the supply station 9 and the discharge station 11, the articles 2 are driven continuously along a closed path along a route which follows at least a quarter of the periphery of the rotating member, so that the gripping members 3 can come into contact with the articles and group them in successive batches 4.

The speed of the rotating member is greater than the input speed (VE) of the articles.

The gripping members 13 are driven and travel along a path in closed loop at a so-called transfer speed VT.

This transfer speed VT is greater than or equal to the input speed VE, so that the articles are accelerated between the supply station 9 and the discharge station 11.

The input speed VE and output speed VS being predefined, the transfer means 12 are arranged so that the transfer speed VT of the gripping members 13 varies along their path, so that:

when the articles 2 are engaged at the supply station 9, the transfer speed VT is substantially equal to the input speed VE;

when the articles 2 are transferred, that is to say between the supply station 9 and the discharge station 11, the transfer speed VT is greater than the input speed VE; and when the articles 2 are disengaged at the discharge station 11, the transfer speed VT is substantially equal to the output speed VS.

Thus the engagement and disengagement of the articles 2 are effected without impact and without jolts.

According to one embodiment, illustrated in FIGS. 1 and 2, the transfer means 12 comprise a toothed wheel 14 mounted at least partly pivoting about a substantially vertical rotation axis R, perpendicular to the plane M, and driven in rotation by a drive means 15, such as a motor 16.

This toothed wheel 14 is disposed in the transfer zone 5, close to the supply track 8 and discharge track 10, for example adjacent to them.

According to one embodiment, the gripping members 13 are in the form of regularly spaced teeth 13, for example six in number, projecting radially from the toothed wheel 14.

When the wheel 14 rotates about its axis R. each tooth 13 describes a circle, passing through a first angular position θE in which it engages, at the supply station 9, at least one article 2 coming from the supply track 8, and a second angular position θS in which it disengages the article 2 at the discharge station on the discharge track 10.

For each tooth 13, its angular position with respect to the axis R of rotation of the toothed wheel 14 .is denoted θ, this angular position θ being defined arbitrarily as the angular distance separating a fixed transverse radius r of the toothed wheel 14 and a movable radius r' passing through the tooth 13.

The angular distance between the first and second angular positions θE, θS is for example between 90° and 180° approximately.

According to one embodiment, this angular distance is approximately 120°, as appears in FIGS. 2 and 3.

The transfer speed VT is the tangential speed of the teeth 13 when the wheel 14 rotates.

The variations in the transfer speed VT of the tooth 13 according to its angular position θ can be defined as follows.

When θ is substantially equal to θE, the speed of transfer VT is substantially equal to the input speed VE of the articles.

In this way, the tooth 13 engages at least two articles 2 continuously, without striking them (FIGS. 1 and 2), forming a batch 4 of grouped articles.

The transfer speed VT then increases continuously with the angular position θ in order to reach a value substantially equal to the output speed VS.

Thus a space is created between the batch 4 and the articles 2 still on the supply track 8.

The batch 4 then reaches the discharge station 11, where it is arranged on the discharge track 10, which takes it over at a constant speed VS, whilst the tooth 13 disengages therefrom.

According to one embodiment, described now with reference to FIGS. 1 to 3, the toothed wheel 14 comprises a circular fixed base 17 and a rotary disc 18, referred to as a plate in the remainder of the description.

The base 17 and the plate 18 are substantially coaxial, of axis R, and placed one above the other, the plate 18 being disposed above the base 17; they define together a substantially cylindrical enclosure 19.

A location close to the axis R is said to be internal, in contradistinction to a location at a distance from the axis R, said to be external.

Radial branches 20 disposed in a star shape are inserted in the enclosure 19 between the base 17 and the plate 18.

Each branch 20 has on the one hand an end 21 turned inwards, fixed to the plate 18 by means of a pivot 22 of axis R1 parallel to the axis R, all the pivots 22 being inscribed in a circle of axis R.

Each branch 20 also has a free end 23 turned outwards, projecting radially from the enclosure 19 in order to form the tooth 13 described above.

The rotation of the plate 18 about its axis R causes the rotation of the branches 20 in a circular movement of axis R, each branch 20 sweeping, in its movement, the space defined by the enclosure 19.

The pivoting of each branch 20 about its axis R, with respect to the plate 18, is controlled by a roller 20 or a toe of axis R2 parallel to the axis R, fixed at the internal end of the branch 20, at a distance from the pivot 22.

Each roller 24 cooperates with a groove 25 forming a cam, provided in the base 17, in which the roller 24 travels when the plate 18 rotates, this groove 25 being extended in a closed loop around the rotation axis R of the toothed wheel 14.

This groove 25 forms in the base a continuous cam track 26, followed by the roller 24, which thus forms the cam follower.

This groove 25 is arranged so that:

when the tooth 13 passes through the supply station 9, the branch 20 which carries it pivots in the direction opposite the rotation of the wheel 14 so that the speed of the tooth 13 decreases until it is substantially equal to the input speed VE at the time of engagement of the articles; and according to a first embodiment, between the supply station 9 and the discharge station 11, the said branch 20 pivots in the direction of the rotation of the wheel 14 so that the speed of the tooth 13 increases until it is substantially equal to the output speed VS, so that the articles are grouped in batches, accelerated and spaced apart;

according to a second embodiment, between the supply station 9 and the discharge station 11, the orientation of the said branch 20 being constant with respect to the wheel 14, so that the speed of the tooth 13 increases until it is substantially equal to the speed of the toothed wheel 14, so that the articles are grouped together in batches, accelerated and spaced apart.

The second embodiment is now described in detail.

The cam track 26 has a pseudo-circular shape with axis R, and comprises two connected portions:

a first portion 27 with a substantially constant curvature, that is to say substantially circular with axis R, extending over approximately a half-turn to three-quarters of a turn around the axis R, turned towards the discharge station 11;

a second portion 28 having a variable curvature, extending over approximately a quarter of a turn to a half-turn around the axis R, and turned towards the supply station 9.

The cam track 26 having a radius of curvature ρ (FIG. 3), it should be stated that the curvature of the cam track 26 is defined by the inverse 1/ρ of the radius of curvature ρ.

In this way:

when the roller 24 passes in the constant-curvature portion 27, the orientation of the branch 20 is substantially constant, the speed VT of the tooth 13 thereby being substantially constant;

when the roller 24 passes in the variable-curvature portion 28, the branch 20 pivots about its axis R1, the speed VT of the tooth 13 varying accordingly.

According to an embodiment illustrated in FIG. 3, the portion 28 comprises:

a first part 28a adjacent to the constant-curvature portion 27, and extending angularly over approximately a quarter of a turn; and a second part 28b situated close to the input station 9, between the first part 28a and the constant-curvature portion 27, and which extends angularly over a few degrees, for example approximately 10.

The first part 28a has a curvature which increases substantially linearly from the constant-curvature portion 27 up to the second part 28b, so as to form a spiral arc with axis R.

The second part, for its part, has a curvature which decreases from the first part 28a to the constant-curvature portion 27.

In addition, the variable-curvature portion 28 comprises a baffle 29 situated close to the supply station 9, at the junction between the first part 28a and the second part 28b.

When the roller 24 leaves the portion 27 and engages in the first part 28a, the latter forces it to move away from the axis R, so that the branch 20 pivots in the direction of rotation of the plate 18, the transfer speed VT of the tooth 13 then being increasing (FIGS. 4 and 5).

The tooth 13 gets ahead with respect to the plate 18.

When the roller 24 passes the baffle 29 and then engages in the second part 28b, the latter forces it to move closer to the axis R, so that the branch 20 pivots in the direction opposite the rotation of the plate 18, the transfer speed VT of the tooth 13 then decreasing.

The speed VT of the tooth decreases until it is substantially equal to the input speed VE when the tooth 13 passes through the supply station 11, in order to ensure the jolt-free gripping of the articles 2, the roller then being substantially in the middle of the second part 28b (FIGS. 3 to 5).

The tooth 13 therefore loses its advance, and falls behind with respect to the plate 18.

Regaining the circular portion 27, the roller 24 forces the branch 20 to keep a constant orientation with respect to the toothed wheel, so that the speed VT of the tooth 13 increases substantially up to the speed of the toothed wheel 14, substantially equal to the output speed VS, the articles 2 being grouped in batches 4, accelerated and spaced apart.

According to the first embodiment, regaining the circular portion 27, the roller 24 forces the branch 20 to pivot about its axis R1 in the direction of the rotation of the plate 18, so as to progressively accelerate the tooth 13 so that its speed VT increases substantially up to the output speed VS, the articles 2 being grouped in batches 4, accelerated and spaced apart.

In the two embodiments, the tooth 13 therefore recovers its retardation with respect to the plate 18.

By forming a cam follower, the roller 24 therefore makes it possible to regulate the transfer speed VT of the tooth 13 during the rotation of the plate 18.

The adjustment of the toothed wheel 14 in order to permit notably the change in the number of articles 2 per batch 4 is effected by angularly offsetting the base 17 so as to angularly offset the cam track 26:

in the direction of the rotation of the plate 18 in order to reduce the number of articles 2 per batch 4; or in the direction opposite the rotation of the plate 18 in order to increase the number of articles 2 per batch 4; and by causing the ratio between the speeds of a star wheel 37 (defined below) and the wheel 14 to vary.

Thus, for example, in order to group together n successive articles, the relative speeds are such that a tooth 13 engages one article 2 every n articles 2 advanced by the star wheel 37.

It is thus possible to easily and rapidly change the number of articles per batch.

Moreover, in order to facilitate the gripping of the articles 2, the teeth 13 are extended in an elevation direction, and have a surface 30 able to match the shape of the articles 2.

According to one embodiment, the teeth 13 have two opposite external surfaces 31, 32 curved in order to match the shape of a cylindrical article 2, as well as two guide surfaces, top 33 and bottom 34, projecting vertically on each side of each branch 20.

The guide surfaces 33, 34 extend tangentially with respect to the wheel 14, and are in abutment respectively on a circumference 35 of the plate 18 and on a circumference 36 of the base 17, on which they slide when the plate 18 rotates with respect to the base 17.

In order to sequence and time the articles 2 coming from the supply track 8 so that they have the required positioning and separation when engaged by the teeth 13, the device 1 can also comprise a star wheel 37.

The star wheel 37 is mounted so as to pivot about a rotation axis R substantially parallel to the rotation axis R of the toothed wheel 14.

According to one embodiment, illustrated in FIGS. 1 and 2, the star wheel 37 comprises at its periphery teeth 38 which mesh from the articles 2 coming from the supply track 8, and disengages with them at the supply station 9 to enable them to be gripped by the teeth 13 on the toothed wheel 14.

To this end, the teeth 38 have housings 39 able to receive the articles 2 individually, the shape of each housing 39 being substantially complementary to an article 2.

In order to ensure a continuous movement of the articles 2, the tangential speed of the star wheel 37, or of the housings 39, is substantially equal to the input speed VE.

The rotation of the star wheel 37 can be provided by a drive means (not shown) such as a motor.

According to one embodiment, one of the motors of the drive means, or both, are connected to a control and slaving device (not shown), which is arranged to apply a predetermined speed profile to them.

To this end, the control device can include a memory, for example a computer memory, in which a certain number of speed profiles are preprogrammed, amongst which one of them is chosen to be applied to one of the motors of the drive means, or amongst which two of them are chosen to be applied to the two motors of the said means.

According to one embodiment, the said motor is a motor whose rotation speed is adjustable continuously, for example an electric motor, of the brushless DC type.

The travel of a set of two consecutive articles 2 is now described, one 2a being said to be upstream, the other 2b downstream, intended for the same batch 4, from the station, according to a setting in which the installation 1 produces packs of four articles (that is to say two batches of two articles).

The two articles 2a, 2b are routed along the supply track 8 at a constant speed VE as far as a transfer zone 5, where they are engaged by the star wheel 37, which causes them to describe a path in the shape of an arc of a circle, still at a constant speed VE, as far as the supply station 9.

They are then simultaneously disengaged by the star wheel 37 and engaged by the toothed wheel 14, a tooth 13 coming into engagement with the upstream article 2a at a speed equal to the input speed VE.

The articles 2a, 2b then undergo a progressive acceleration under the effect of the increase in the speed VT of the tooth 13.

The effect of this acceleration is to group them in one batch 4, whilst spacing them apart from the following articles 2, not yet engaged by the toothed wheel 14.

The articles 2a, 2b then describe a path substantially in the shape of an arc of a circle along the periphery of the wheel 14, for example a quarter of a circle, at the end of which they are disposed on the discharge track, at a speed equal to the output speed VS.

When changing the "machine pitch" P (which corresponds to the distance separating two consecutive batches of articles), the toothed wheel 14 is changed, and replaced by:

a wheel 14 comprising a smaller number of branches 20 for an increase in the pitch P; or a wheel 14 comprising a greater number of branches 20 for a reduction in the pitch P.

What is claimed is:

1. A device for forming successive batches (4) of articles (2), which comprises:

a supply track (8) along which the articles (2) are routed one by one up to a supply station (9), at a substantially constant input speed (VE);

a discharge track (10) able to receive, at a discharge station (11), the successive batches (4) of the articles (2) in order to route them at a output speed (VS) greater than the input speed (VE);

means (12) of transferring the articles (2) from the supply station (9) to the discharge station (11), comprising a rotating member able to take and group the articles (2) in order to form the batches (4) spaced apart, said rotating member comprising a succession of gripping members (13) arranged so as to engage the articles (2) at the supply station (9) and to disengage them at the discharge station (11), driven continuously along a closed path, at a transfer speed (VT), greater than or equal to the input speed (VE);

the transfer means (12) being arranged so that the transfer speed (VT) of the gripping members (13) is not constant, so that:

when the articles (2) are engaged, the transfer speed (VT) of the gripping members (13) is substantially equal to the input speed (VE);

when the articles (2) are transferred, the transfer speed (VT) of the gripping members (13) is greater than the input speed (VE);

when the articles (2) are disengaged, the transfer speed (VT) of the gripping members (13) is substantially equal to the output speed (VS);

characterised in that the articles are driven continuously along said closed path on a route which follows at least a quarter of the periphery of the rotating member, so that the gripping members can come into contact with the articles and group them in successive batches, the speed of the rotating member being greater than the input speed (VE) of the articles and the rotating member making it possible to vary the number of articles per batch.

2. A device according to claim 1, characterised in that the rotating member of the transfer means (12) comprises a toothed wheel (14), at least part (18) of which is mounted so as to pivot about an axis (R) of rotation, the wheel (14) being disposed close to the supply track (8) and the discharge track (10), the wheel (14) comprising said gripping members (13).

3. A device according to claim 2, characterised in that said gripping members (13) are in the form of teeth (13) substantially regularly spaced apart, projecting radially from the toothed wheel (14), each tooth (13) describing a circle, passing through a first angular position ($\theta$E) in which it engages with at least one of said articles (2) at the supply station (9), and a second angular position ($\theta$S) in which it disengages from it at the discharge station (11).

4. A device according to claim 3, characterised in that the angular distance between the first and second angular positions ($\theta$E, $\theta$S) is between 90 and 180 degrees.

5. A device according to claim 3, characterised in that said toothed wheel (14) comprises a circular fixed base (17) and a rotating disc (18), coaxial and placed one above the other, between which there are disposed radial branches (20) whose free ends (23) form said teeth (13).

6. A device according to claim 5, characterised in that said branches (20) are mounted for rotation on the rotating disc (18) by means of pivots (22) with axis (R1) parallel to the axis (R) of the toothed wheel (14).

7. A device according to claim 6, characterised in that each branch (20) has a roller (24) or a toe which cooperates with a groove (25) provided in the base (17), this groove (25) being extended in a closed loop around the axis (R) of rotation of the toothed wheel (14).

8. A device according to claim 1, characterised in that said gripping members (13) are in the form of teeth (13) and said groove (25) is arranged so that:

when one of said teeth (13) passes through the supply station (9), the branch (20) which carries it pivots in the direction opposite the rotation of the wheel (14) so that the transfer speed (VT) of the tooth (13) decreases until it is substantially equal to the input speed (VE) when the articles are engaged (2);

between the supply station (9) and the discharge station (11), the orientation of said branch (20) being constant with respect to the wheel (14), so that the transfer speed (VT) of the tooth increases until it is substantially equal to the speed of the toothed wheel (14), so that the articles (2) are grouped in said batches (4), accelerated and spaced apart.

9. A device according to claim 8, characterised in that said groove (25) forms in the base (17) a continuous cam track (26) followed by a roller (24) which forms a cam follower, this cam track (26) comprising two connected portions (21, 28), a first portion (21), turned towards the discharge station (11), has a substantially constant curvature, and a second portion (28), turned towards the supply station (9), has a variable curvature, so that:

when the roller (24) passes in the first portion (28), the orientation of the branch (20) is substantially constant;

when the roller (24) passes in the second portion, the branch (20) which carries it pivots about its axis (R1).

10. A device according to claim 5, characterised in that the teeth (13) comprise a guide surface (34) able to cooperate with a circumference (36) of the base (17).

11. A device according to claim 1, characterised in that it also comprises means (31) disposed close to the supply station, able to sequence and time the articles (2) coming from the supply track (8), so that they have the required positioning and separation at the time they are gripped by the transfer means (12).

12. A device according to claim 11, characterised in that the means (31) for sequencing and timing the articles are in the form of a star wheel (31), mounted so as to pivot about an axis of rotation (R'), comprising at its periphery teeth (38) able to engage and disengage the articles (2), the teeth (38) having housings (39) able to receive the articles (2) individually, the tangential speed of said star wheel (31) being substantially equal to the input speed (VE).

13. A device according to claim 12, characterised in that it comprises a means of driving said star wheel, connected to a control device arranged so as to apply to said drive means a predetermined speed profile, chosen from amongst a preprogrammed set of speed profiles.

14. A device according to claim 1, characterised in that it comprises a means (15) of driving the toothed wheel (14), connected to a control device arranged so as to apply to said drive means (15) a predetermined speed profile, chosen from amongst a preprogrammed set of speed profiles.

15. A device according to claim 13, characterised in that said drive means is in a form of a motor whose rotation speed is adjustable continuously.

16. A device according to claim 15, characterised in that said motor is an electric motor, of a brushless DC type.

* * * * *